(12) United States Patent
He et al.

(10) Patent No.: US 10,526,087 B2
(45) Date of Patent: Jan. 7, 2020

(54) UNMANNED AERIAL VEHICLE AND UNMANNED AERIAL VEHICLE BODY CONFIGURED FOR UNMANNED AERIAL VEHICLE

(71) Applicant: GUANGZHOU XAIRCRAFT TECHNOLOGY CO., LTD., Guangzhou (CN)

(72) Inventors: Jianbing He, Guangzhou (CN); Zhiwen Lin, Guangzhou (CN); Pan Jiang, Guangzhou (CN); Dingfeng Xiao, Guangzhou (CN); Bin Peng, Guangzhou (CN)

(73) Assignee: GUANGZHOU XAIRCRAFT TECHNOLOGY CO., LTD., Guangzhou (CN)

( * ) Notice: Subject to any disclaimer, the term of this patent is extended or adjusted under 35 U.S.C. 154(b) by 298 days.

(21) Appl. No.: 15/523,897

(22) PCT Filed: Jul. 27, 2016

(86) PCT No.: PCT/CN2016/091932
§ 371 (c)(1),
(2) Date: May 2, 2017

(87) PCT Pub. No.: WO2017/020763
PCT Pub. Date: Feb. 9, 2017

(65) Prior Publication Data
US 2017/0327222 A1    Nov. 16, 2017

(30) Foreign Application Priority Data

Jul. 31, 2015   (CN) .......................... 2015 1 0467838
Jul. 31, 2015   (CN) .......................... 2015 1 0468299
Jul. 31, 2015   (CN) .................... 2015 2 0574460 U

(51) Int. Cl.
  *B64C 39/02*   (2006.01)
  *B64C 1/06*    (2006.01)
  (Continued)

(52) U.S. Cl.
  CPC .............. *B64C 39/024* (2013.01); *B64C 1/06* (2013.01); *B64C 27/08* (2013.01); *B64D 27/24* (2013.01);
  (Continued)

(58) Field of Classification Search
  CPC ......... B64C 1/06; B64C 27/08; B64C 39/024; B64C 2201/024; B64C 2201/042; B64D 1/18; B64D 27/24
  (Continued)

(56) References Cited

U.S. PATENT DOCUMENTS 9,051,050 B2    6/2015   Achtelik et al.
2013/0287577 A1  10/2013  Lin et al.
(Continued)

FOREIGN PATENT DOCUMENTS

CN   203681871       7/2014
CN   203865003 U    10/2014
(Continued)

OTHER PUBLICATIONS

JPO, Office Action for JP Application No. 2017527807, dated Mar. 30, 2018.
(Continued)

*Primary Examiner* — Bret Hayes
(74) *Attorney, Agent, or Firm* — Hodgson Russ LLP

(57) ABSTRACT

An unmanned aerial vehicle is provided and includes: an unmanned aerial vehicle body, including an airframe and an articles storing device; an arm, including at least two front arms symmetrically arranged with respect to a central axis of the airframe along a front-rear direction and at least two rear
(Continued)

arms symmetrically arranged with respect to the central axis of the airframe; and a rotor-wing electric motor, including a front electric motor and a rear electric motor. A first end of the front arm is connected with a front end of the airframe, and a second end of the front arm is provided with the front electric motor to drive the unmanned aerial vehicle. A first end of the rear arm is connected with a rear end of the airframe, and a second end of the rear arm is provided with the rear electric motor to drive the unmanned aerial vehicle.

19 Claims, 11 Drawing Sheets

(51) Int. Cl.
  *B64C 27/08* (2006.01)
  *B64D 27/24* (2006.01)
(52) U.S. Cl.
  CPC .. *B64C 2201/024* (2013.01); *B64C 2201/042* (2013.01)
(58) Field of Classification Search
  USPC ........................................................ 244/17.23
  See application file for complete search history.

(56) References Cited

U.S. PATENT DOCUMENTS

| | | | | |
|---|---|---|---|---|
| 2014/0117149 | A1* | 5/2014 | Zhou | A63H 27/12 244/17.23 |
| 2014/0131510 | A1* | 5/2014 | Wang | B64C 39/024 244/17.23 |
| 2014/0263822 | A1 | 9/2014 | Malveaux | |
| 2016/0144954 | A1* | 5/2016 | Daigle | B64C 39/024 244/17.23 |
| 2016/0159471 | A1* | 6/2016 | Chan | B64C 39/024 244/39 |
| 2016/0207368 | A1* | 7/2016 | Gaonjur | B60F 5/02 |
| 2016/0347447 | A1* | 12/2016 | Judas | B64C 29/0033 |
| 2017/0070125 | A1* | 3/2017 | Bei | H02K 21/22 |
| 2017/0248125 | A1* | 8/2017 | Luchsinger | F03D 9/32 |
| 2017/0313410 | A1* | 11/2017 | Ismagilov | B64C 27/08 |
| 2018/0141647 | A1* | 5/2018 | Suzuki | B64C 27/08 |

FOREIGN PATENT DOCUMENTS

| | | |
|---|---|---|
| CN | 204056294 | 12/2014 |
| CN | 104354864 | 2/2015 |
| CN | 204232146 U | 4/2015 |
| CN | 104670499 | 6/2015 |
| CN | 104691749 | 6/2015 |
| CN | 204399473 | 6/2015 |
| CN | 204620259 U | 9/2015 |
| CN | 204638398 U | 9/2015 |
| CN | 105173068 | 12/2015 |
| CN | 204895873 | 12/2015 |
| CN | 204998762 | 1/2016 |
| DE | 102008018901 | 12/2009 |
| JP | 4124531 B2 | 7/2008 |
| JP | 2009269493 | 11/2009 |
| JP | 5700796 B2 | 4/2015 |
| JP | 2015137092 | 7/2015 |
| TW | 201526967 | 7/2015 |
| WO | 2008147484 | 12/2008 |
| WO | 2009115300 | 9/2009 |
| WO | 2012162421 | 11/2012 |

OTHER PUBLICATIONS

EPO, Office Action for EP Application No. 16832251, dated Apr. 17, 2018.
APO, Office Action for AU Application No. 2016303994, dated May 24, 2018.
KIPO, Office Action for KR Application No. 20177012662, dated Mar. 13, 2018.
KIPO, Office Action for KR Application No. 20177012662, dated Sep. 21, 2018.
The State Intellectual Property Office of People's Republic of China, First Office Action for CN201510902014.7, dated Jul. 11, 2016.

* cited by examiner rearward type
$0° < \beta < 90°$ radial type
$\beta = 90°$ forward type
$90° < \beta < 180°$ rotation direction

UNMANNED AERIAL VEHICLE AND UNMANNED AERIAL VEHICLE BODY CONFIGURED FOR UNMANNED AERIAL VEHICLE

CROSS-REFERENCE TO RELATED APPLICATIONS

The present application is a national phase entry under 35 USC § 371 of International Application PCT/CN2016/091932, filed Jul. 27, 2016, which claims the benefit of and priority to Chinese Patent Application No. 201510468299.8, filed Jul. 31, 2015, Chinese Patent Application No. 201520574460.5, filed Jul. 31, 2015, and Chinese Patent Application No. 201510467838.6, filed Jul. 31, 2015, the entire disclosures of which are incorporated herein by reference.

FIELD

The present disclosure relates to a field of aircraft, especially to an unmanned aerial vehicle and an unmanned aerial vehicle body configured for an unmanned aerial vehicle.

BACKGROUND

An unmanned aerial vehicle is an unmanned aircraft manipulated by means of radio remote control equipment and a self-contained program control device. The application of the unmanned aerial vehicle has expanded to a plurality of civil fields. The unmanned aerial vehicle represented by agricultural applications usually adopts a form of multiple rotor wings, and is an aircraft having a plurality of propellers, and a plurality of aircraft arms for arrangement of the propellers which are in a crossed form. As the plurality of propellers are arranged around the aircraft and provide approximately equal lift forces, the total lift force is equivalent to acting on an intersection point of the aircraft arms, i.e. a geometric center of a plane where an airframe is. Thus, other weight-bearing components of the unmanned aerial vehicle are arranged upon and/or below the geometric center so as to make an acting point of the total gravity of the aircraft close to the geometric center of the plane of the airframe as much as possible, thus keeping a balance with the total lift force.

SUMMARY

Embodiments of the present disclosure are presented as follows.

An unmanned aerial vehicle is provided and includes: an unmanned aerial vehicle body including an airframe and an articles storing device disposed behind the airframe and used to store a variable weight part; at least two front arms symmetrically arranged with respect to a central axis of the airframe along a front-rear direction, a first end of the front arm is connected with a front end of the airframe and extends forwards, and a second end of the front arm is provided with the front electric motor to drive the unmanned aerial vehicle; at least two rear arms symmetrically arranged with respect to the central axis of the airframe, a first end of the rear arm is connected with a rear end of the airframe and extends backwards, and a second end of the rear arm is provided with a rear electric motor to drive the unmanned aerial vehicle. An intersection region E bounded by respective extension lines of the rear arm and the front arm towards the airframe is located in front of a lift force center of the unmanned aerial vehicle, an acting point of a resultant force from the front electric motor and the rear electric motor exerted on the unmanned aerial vehicle is the lift force center, and a gravity center of the unmanned aerial vehicle is adjacent to the lift force center.

The arm is formed to be a linear shape or an arc shape.

The arm is provided with at least two arm fixing pieces, and each of the arm fixing pieces includes: a first fixing portion connected with the airframe; and a second fixing portion connected with the airframe, the first fixing portion and the second fixing portion are connected and fitted with each other to define a mounting groove, the arm is disposed through the mounting groove, and the first fixing portion and the second fixing portion are separately provided with at least one outer flat surface connected with the airframe.

Two or more arm fixing pieces spaced apart are adopted, making the airframe, the arm fixing pieces and the arms connected as a whole, the plurality of the arm fixing pieces are locked in a plurality of places, which ensures that the arm is not easy to swing in an axial direction. In addition, the arm is fixed to the plurality of the arm fixing pieces at a demanded deflection angle, the arm fixing pieces at the same side are flushed with an airframe plane, and then the arm is mounted to the airframe.

The arm is provided with an arm deflection locking hole, the first fixing portion and the second fixing portion are both provided with an arm deflection fixing hole in a position corresponding to the arm deflection locking hole. The arm may be locked in a radial direction of the arm, and be prevented from swinging in the axial direction when the arm is locked in a plurality of spaced positions along the axial direction of the arm.

The first fixing portion and the second fixing portion are separately provided with an arc inner surface matching with an outer wall of the arm.

The first fixing portion and the second fixing portion are separately provided with an arm fastening hole for bolted connection with each other and an airframe connecting hole for bolted connection with the airframe.

A folding cavity body, an adaptor and a sprinkle-nozzle foldable rod are disposed below the arm, a driving assembly is disposed within the folding cavity body, a central portion of the adaptor is articulated within the folding cavity body, a front end of the adaptor is connected with the driving assembly, and a rear end of the adaptor passes through an opening of the folding cavity body and is fixedly connected with a first end of the sprinkle-nozzle foldable rod. By means of the foldable sprinkle-nozzle foldable rod, the sprinkle-nozzle foldable rod may be folded and stored in an un-working state.

The driving assembly includes a driving body, a driving shaft and a connection portion mounted within a casing. The driving shaft may be rotatably connected with the driving body and the connection portion, and the driving body is used to drive the driving shaft to rotate so that the connection portion pushes the adaptor to rotate relative to the casing between a first position and a second position. The driving body is configured as a gear motor, the driving shaft is configured as a screw rod, and the connection portion is configured as a sliding block.

An outer wall of the driving shaft is provided with an outer thread, the connection portion is provided with a fitting hole, an inner wall bounding the fitting hole is provided with an inner thread, the driving shaft goes through the connection portion, and the outer thread is fitted with the inner thread.

A first end of the driving shaft away from the driving body is provided with a thrust bearing, the thrust bearing is fixed within the casing, and the driving shaft is rotatably disposed through the thrust bearing.

A front end of the adaptor is formed to be a U-shaped groove and the connection portion is arranged in the U-shaped groove.

The unmanned aerial vehicle includes: a control module used to control the driving assembly to drive the adaptor to rotate; and a current detection module, in which the current detection module is used to detect whether a current of the driving assembly is larger than a preset threshold, if the current of the driving assembly is not larger than the preset threshold, the current detection module is used to continue detecting whether the current of the driving assembly is larger than the preset threshold, and if the current of the driving assembly is larger than the preset threshold, the current detection module is used to send a control signal for turning off the driving assembly to the control module; the control module is used to turn off the driving assembly according to the control signal.

A heat dissipation waterproof cover is disposed on an upper end face of the rotor-wing electric motor, the heat dissipation waterproof cover includes an upper sealing surface and a sidewall circumferential surface, a certain number of ventilation holes are disposed in the sidewall circumferential surface adjacent to the upper sealing surface, and a blade distant from a center of the heat dissipation waterproof cover is disposed in the heat dissipation waterproof cover and extends from the ventilation hole towards a center of an inner wall of the upper sealing surface. The heat dissipation waterproof cover is rotated along with a rotor of the rotor-wing electric motor as the rotor is rotated, and the blade inside the heat dissipation waterproof cover is rotated around a circle center, which makes the hot air produced by the rotation of the rotor-wing electric motor be thrown out by a centrifugal force produced by the rotation of the blade. Meanwhile, a negative pressure is produced in the heat dissipation waterproof cover, an airstream enters into a lower portion of the rotor-wing electric motor, and flows out from the ventilation hole of the sidewall circumferential surface after being thrown out by the centrifugal force, thereby keeping the airstream flowing to dissipate heat for the rotor-wing electric motor. In addition, as an upper end face of the heat dissipation waterproof cover of the rotor-wing electric motor covers an upper portion of the electric motor, rain cannot enter the rotor-wing electric motor from the upper portion, and is blown away by the high-speed airstream thrown out of the ventilation hole when flowing towards a joint area of the upper end face of the heat dissipation waterproof cover and the sidewall circumferential surface.

An annular cavity fitted with an air hole inside the rotor-wing electric motor is formed between the center of the inner wall center of the upper sealing surface and the blade.

A height of a portion of the blades near the center of the inner wall center of the upper sealing surface is smaller than a height of another portion of the blades near the ventilation hole.

The unmanned aerial vehicle provided in the present disclosure may also have the following additional technical features.

In some embodiments of the present disclosure, the lift force center is adjacent to a gravity center of the articles storing device.

In some embodiments of the present disclosure, the gravity center of the unmanned aerial vehicle, the lift force center and the gravity center of the articles storing device coincide.

In some embodiments of the present disclosure, two front arms and two rear arms are provided.

In some embodiments of the present disclosure, an included angle between the two front arms is larger than an included angle between the two rear arms.

In some embodiments of the present disclosure, a length of the rear arm is larger than a length of the front arm.

In some embodiments of the present disclosure, the second ends of the two front arms and the second ends of the two rear arms are located in four vertexes of a rectangle.

In some embodiments of the present disclosure, the second ends of the two front arms and the second ends of the two rear arms are located in four vertexes of a square.

In some embodiments of the present disclosure, the rear arm is configured to be a linear shape or an arc shape.

In some embodiments of the present disclosure, the front end of the airframe includes a front arrangement plate, and the front arrangement plate is provided with the control module, the current detection module and an auxiliary device of the unmanned aerial vehicle. A battery of the unmanned aerial vehicle is disposed within the articles storing device.

An unmanned aerial vehicle body is provided and the unmanned aerial vehicle body includes an airframe and an articles storing device disposed behind the airframe and configured to store a variable weight part, in which the unmanned aerial vehicle body is configured for an unmanned aerial vehicle, and the unmanned aerial vehicle further includes: an arm including at least two front arms symmetrically arranged with respect to a central axis of the airframe along a front-rear direction and at least two rear arms symmetrically arranged with respect to the central axis of the airframe; a rotor-wing electric motor including a front electric motor and a rear electric motor; in which a first end of the front arm is connected with a front end of the airframe, and a second end of the front arm is provided with the front electric motor to drive the unmanned aerial vehicle; a first end of the rear arm is connected with a rear end of the airframe, and a second end of the rear arm is provided with the rear electric motor to drive the unmanned aerial vehicle; and an acting point of a resultant force from the front electric motor and the rear electric motor exerted on the unmanned aerial vehicle is the lift force center, and a gravity center of the unmanned aerial vehicle is adjacent to the lift force center, a projection of the lift force center on a horizontal plane is configured to be adjacent to a projection of a gravity center of the variable weight part on the horizontal plane.

Additional aspects and advantages of the present disclosure will be given in part in the following descriptions, become apparent in part from the following descriptions, or be learned from the practice of the present disclosure.

REFERENCE NUMERALS

Figure 1:
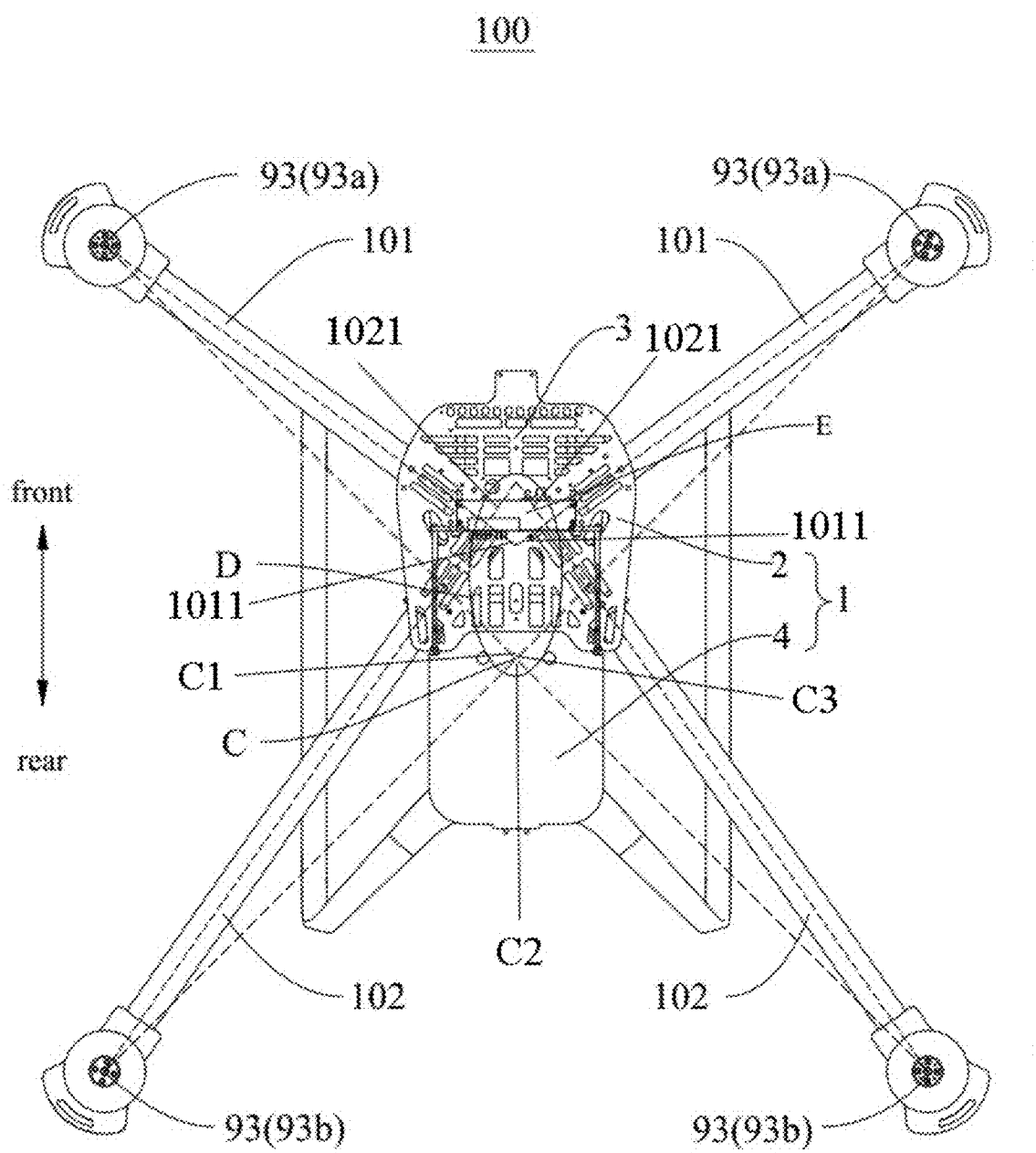
FIG. 1 is a top view of an unmanned aerial vehicle of embodiments of the present disclosure.

100—unmanned aerial vehicle;
1: unmanned aerial vehicle body; 101: front arm; 102: rear arm; 93a: front electric motor; 93b: rear electric motor;
2: airframe; 3: front arrangement plate; 4: articles storing device;
10: first fixing portion; 11: second fixing portion; 12: arm deflection locking hole; 13: arm fastening hole; 14: airframe connecting hole; 15: arm deflection fixing hole; 16: arc inner surface;
41: sprinkling piece; 422: electric motor for sprinkle-nozzle rotation;
81: folding cavity body; 811: left side casing; 812: right side casing; 813: linear sliding groove; 814: circular hole; 815: first end face;
82: adaptor; 821: U-shaped groove; 822: convex shaft; 823: mounting hole of sprinkle-nozzle foldable rod; 824: hollow hole; 825: first contact surface;
83: sprinkle-nozzle foldable rod; 831: sliding block; 832: screw rod;
86: water outlet pipe adaptor; 87: signal interface circuit plate; 88: gear motor; 89: thrust bearing;
90: heat-dissipation waterproof cover; 9: screw; 92: sidewall circumferential surface; 93: rotor-wing electric motor; 911: blade; 912: inner wall of sidewall circumferential surface; 913: positioning hole; 914: upper sealing surface; 915: ventilation hole; 916: annular cavity;
A: first intersection point; B; second intersection point; C: lift force center; E: intersection region;
α: included angle between two rear arms; γ: included angle between two front arms

DETAILED DESCRIPTION

Embodiments of the present disclosure will be described in detail in the following. Examples of the embodiments are shown in the drawings, and the same or similar elements and the elements having same or similar functions are denoted by like reference numerals throughout the descriptions. The embodiments described with reference to the drawings are illustrative, which is only used to explain the present disclosure and shouldn't be construed to limit the present disclosure.

In the specification, it should be understood that terms such as "axial direction", "circumferential direction", "up", "down", "front", "rear", "left", "right", "vertical", "horizontal", "top", "bottom", "inner", "outer" should be construed to refer to the orientation as then described or as shown in the drawings under discussion. These relative terms are for convenience of description and do not require that the present disclosure be constructed or operated in a particular orientation, so shall not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, it should be noted that, unless specified or limited otherwise, the terms "mounted," "connected," "coupled," should be understood broadly, and may be, for example, fixed connections, detachable connections, or integral connections; may also be mechanical or electrical connections; may also be direct connections or indirect connections via intervening structures; may also be inner communications or interaction relationships of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

The present disclosure will be illustrated in detail with reference to drawings and in combination with the embodiments.

As shown in FIG. 1, in embodiments of the present disclosure, a head portion of an unmanned aerial vehicle 100 is located at the front and a tail portion of the unmanned aerial vehicle 100 is located at the rear.

The unmanned aerial vehicle 100 according to embodiments of the present disclosure is described with reference to FIG. 1 to FIG. 17 in the following. As shown in FIG. 1 to FIG. 17, the unmanned aerial vehicle 100 includes an unmanned aerial vehicle body 1, an arm and a rotor-wing electric motor 93.

Referring to FIG. 1, the unmanned aerial vehicle body 1 includes an airframe 2 and an articles storing device 4 disposed behind the airframe 2 and used to store a variable weight part.

The arm includes a front arm 101 and a rear arm 102, and the rotor-wing electric motor 93 includes a front electric motor 93a and a rear electric motor 93b.

At least two front arms 101 are provided and symmetrically arranged with respect to a central axis of the airframe 2 along a front-rear direction, a first end of each of the front arms 101 is connected with a front end of the airframe 2, and a second end of each of the front arms 101 is provided with the front electric motor 93a so as to drive the unmanned aerial vehicle 100.

At least two rear arms 102 are provided and symmetrically arranged with respect to the central axis of the airframe, a first end of each of the rear arms 102 is connected with a rear end of the airframe 2, and a second end of each of the rear arms 102 is provided with the rear electric motor 93b so as to drive the unmanned aerial vehicle 100.

Figure 2:
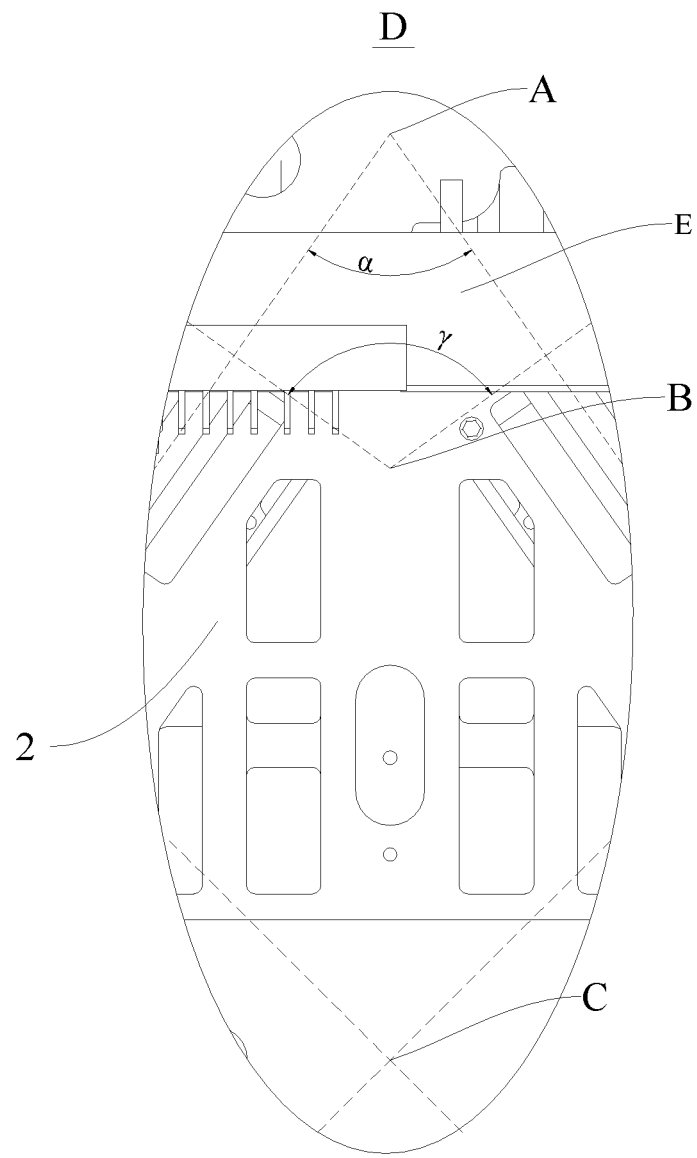
FIG. 2 is a partially enlarged view of portion D in FIG. 1.

In some embodiments of the present disclosure, as shown in FIG. 1 and FIG. 2, an intersection region E of an extension line 1021 of the rear arm 102 towards the airframe 2 and an extension line 1011 of the front arm 101 towards the airframe 2 is located in front of a lift force center C of the unmanned aerial vehicle 100, an acting point of a resultant force from the front electric motor 93a and the rear electric motor 93b exerted on the unmanned aerial vehicle 100 is the lift force center C, and a gravity center C1 of the unmanned aerial vehicle 100 is adjacent to the lift force center C.

The extension line 1021 of the rear arm 102 towards the airframe 2 intersects with the central axis of the airframe 2 at a first intersection point A, and the extension line 1011 of the front arm 101 towards the airframe 2 intersects with the central axis of the airframe 2 at a second intersection point B. As shown in FIG. 1, the extension line 1021, towards the airframe 2, of the rear arm 102 in a right-back direction and the extension line 1011, towards the airframe 2, of the front arm 101 in a left-front direction coincide approximately; the extension line 1021, towards the airframe 2, of the rear arm 102 in a left-back direction and the extension line 10111, towards the airframe 2, of the front arm 101 in a left-front direction coincide approximately; the extension line 1021 of the rear arm 102 towards the airframe 2 intersects with the extension line 1011 of the front arm 101 towards the airframe 2 substantially in a midpoint between the first intersection point A and the second intersection point B; and the midpoint of the first intersection point A and the second intersection point B is located in front of the lift force center C of the unmanned aerial vehicle 100. In some embodiments of the present disclosure, the first intersection point A and the second intersection point B are both located in front of the lift force center C of the unmanned aerial vehicle 100.

It could be understood that, a junction of the rear arm 102 and the airframe 2 is located in the middle of the unmanned aerial vehicle body 1, a junction of the front arm 101 and the airframe 2 is located in the front of the unmanned aerial vehicle body 1, the lift force center C of the unmanned aerial vehicle 100 is located in a position rear of the center of the unmanned aerial vehicle body 1. Thus, the gravity center C1 of the unmanned aerial vehicle 100 is close to the lift force center C.

The gravity center C1 of the unloaded unmanned aerial vehicle 100 is adjacent to the lift force center C of the unmanned aerial vehicle 100, and a gravity center C2 of the articles (the variable weight part) loaded by the unmanned aerial vehicle 100 is also adjacent to the lift force center C of the unmanned aerial vehicle 100, such that a position of the gravity center C1 of the unmanned aerial vehicle 100 changes slightly when the loaded unmanned aerial vehicle 100 is changed into an unloaded state.

In some embodiments of the present disclosure, the front electric motor 93a and the rear electric motor 93b may be electric motors of the same type so as to decrease the kinds of the parts and components of the unmanned aerial vehicle 100.

In some embodiments of the present disclosure, a plurality of hollow structures may be provided in the airframe 2 of the unmanned aerial vehicle 100.

In some embodiments of the present disclosure, as shown in FIG. 1, the lift force center C of the unmanned aerial vehicle 100 may be adjacent to a geometric center C3 of the articles storing device 4. The gravity center C2 of the articles (the variable weight part) loaded in the articles storing device 4 is adjacent to the geometric center C3 of the articles storing device 4, and for liquids or powders, the gravity center thereof and the geometric center C3 of the articles storing device 4 substantially coincide.

In some embodiments of the present disclosure, the gravity center C1 of the unmanned aerial vehicle 100, the lift force center C of the unmanned aerial vehicle 100 and the geometric center C3 of the articles storing device 4 may coincide.

In some embodiments of the present disclosure, the front end of the airframe 2 may include a front arrangement plate 3, and the front arrangement plate 3 is provided with a control module (CM), a current detection module (CDM) and an auxiliary device of the unmanned aerial vehicle 100. A battery of the unmanned aerial vehicle 100 is disposed within the articles storing device 4.

It could be understood that, a constant weight part of the unmanned aerial vehicle 100 may include the unmanned aerial vehicle body 1, the front arm 101, the rear arm 102, the control module, the current detection module, the auxiliary device and the battery. The control module, the current detection module and the auxiliary device which are light are disposed in a front end of the unmanned aerial vehicle body 1, whereas the battery which is heavy is disposed in the rear end of the airframe 2, such that a gravity center of the constant weight part of the unmanned aerial vehicle 100 is located in the position rear of the center of the unmanned aerial vehicle body 1. In addition, the constant weight part and the variable weight part may be arranged as tiled in the front-rear direction.

In some embodiments of the present disclosure, at least a part of batteries may be disposed in a rear end of the articles storing device 4. In other words, at least part of the batteries may be disposed behind the variable weight part.

In some embodiments of the present disclosure, two front arms 101 may be provided, four rear arms 102 may be provided, and the four rear arms 102 may be symmetrically disposed in two sides of the central axis. In some embodiments of the present disclosure, four front arms 101 may be provided, four rear arms 102 may be provided, the four front arms 101 may be symmetrically disposed in two sides of the central axis, and the four rear arms 102 may be symmetrically disposed in two sides of the central axis. The numbers of the front arm 101 and the rear arm 102 are not limited thereto.

In some embodiments of the present disclosure, as shown in FIG. 1, two front arms 101 may be provided and disposed symmetrically in two sides of the central axis, and two rear arms 102 may be provided and disposed symmetrically in two sides of the central axis.

As shown in FIG. 1 and FIG. 2, the second intersection point B is located between the first intersection point A and the lift force center C.

On the other hand, by providing the above structure, it equals to adding two triangular structures to the unmanned aerial vehicle 100. As shown in FIG. 2, the first intersection point A and the second intersection point B are common vertexes of the two triangles, for example, one of the two triangles is configured as a triangle of which a connection line of A and B serves as a first base and an intersection point of the extension line, towards the airframe 2, of the front arm 101 in the left-front direction and the extension line, towards the airframe 2, of the rear arm 102 in the left-back direction serves as a first fixed point, and the other triangle is configured as a triangle of which the connection line of A and B serves as a second base and an intersection point of the extension line, towards the airframe 2, of the front arm 101 in the right-front direction and the extension line, towards the airframe 2, of the rear arm 102 in the right-back direction serves as a second fixed point.

As shown in FIG. 2, a first included between the two rear arms 102 is $\alpha$, a second included between the two front arms 101 is $\gamma$, and a and $\gamma$ meet: $\alpha < \gamma$. Relative to the two front arms 101, the two rear arms 102 may be retracted towards a direction close to the central axis so that the lift force center C of the unmanned aerial vehicle 100 is moved backwards.

In some embodiments of the present disclosure, the first intersection point A may be disposed adjacent to or substantially coincide with the second intersection point B.

In some embodiments of the present disclosure, as shown in FIG. 1, a length of the rear arm 102 may be larger than a length of the front arm 101. That is, a distance from the second end (the end mounted with the rear electric motor 93b) of the rear arm 102 to the first intersection point A may be larger than a distance from the second end (the end mounted with the front electric motor 93a) of the front arm 101 to the second intersection point B. As the junction of the rear arm 102 with the airframe 2 and that of the front arm 101 with the airframe 2 are both moved forward.

In some embodiments of the present disclosure, as shown in FIG. 1, the rear arm 102 may be configured as a linear shape.

In some embodiments of the present disclosure, the rear arm 102 may be configured as an arc shape.

In some embodiments of the present disclosure, for the front arm 101 and the rear arm 102 located at the same side of the central axis, a connection line connecting the front electric motor 93a mounted to the front arm 101 and the rear electric motor 93b mounted to the rear arm 102 is paralleled with the central axis.

In a specific example of the present disclosure, as shown in FIG. 1, the respective second ends (the end mounted with the front electric motor 93a) of the two front arms 101 and the respective second ends (the end mounted with the rear electric motor 93b) of the two rear arms 102 may be located in four vertexes of a square.

It could be understood that, the lift force center C of the unmanned aerial vehicle 100 in a stable state is a center of the above square, and the gravity center C1 of the unloaded unmanned aerial vehicle 100 as well as the gravity center C2 of the articles (the variable weight part) loaded by the unmanned aerial vehicle 100 may be both located near the center of the square.

The unmanned aerial vehicle 100 according to embodiments of the present disclosure may be an agricultural unmanned aerial vehicle, and correspondingly, the articles (the variable weight part) loaded by the unmanned aerial vehicle 100 may be agrichemicals. As the constant weight part and the variable weight part of the unmanned aerial vehicle 100 are arranged as tiled in the front-rear direction. During the flight of the unmanned aerial vehicle 100, the agrichemicals may be gradually sprinkled out from the articles storing device 4 through a hose, and in a process of reducing the agrichemicals (the weight of the variable weight part changes), the gravity center C1 of the unmanned aerial vehicle 100 is always located around the lift force center C of the unmanned aerial vehicle 100.

In summary, the unmanned aerial vehicle 100 according to embodiments of the present disclosure includes at least two front arms 101 and at least two rear arms 102, by moving the junction of the rear arm 102 and the airframe 2 forward relative to the center of the airframe 2, the first intersection point A, the second intersection point B and the lift force center C of the unmanned aerial vehicle 100 are arranged in sequence from front to back along the front-rear direction of the unmanned aerial vehicle 100, and in addition, the articles storing device 4 is disposed in the position rear of center of the unmanned aerial vehicle 100, which makes the gravity center C1 of the unmanned aerial vehicle 100 and that of the articles (the variable weight part) loaded by the unmanned aerial vehicle 100 adjacent to the lift force center C of the unmanned aerial vehicle 100. The articles storing device 4 is not obstructed.

The unmanned aerial vehicle 100 according to embodiments of the present disclosure will be described further with reference to FIG. 1 to FIG. 14.

The technical solution provided in the present disclosure is not only applicable to a quadrotor, but also to a multi-rotor aircraft with multiple axes, such as six axes or eight axes.

As shown in FIG. 1, the unmanned aerial vehicle 100 in the present embodiment includes four arms arranged around the airframe 2, respective axes of the arms extend toward the airframe 2, a first end of each arm is connected with the airframe 2, and a second end thereof is provided with the rotor-wing electric motor. In a heading direction of the unmanned aerial vehicle 100, the front arm 101 provided is shorter, and the provided rear arm 102 is longer. The extension lines of the arms connecting the position of the airframe 2 coincide approximately (i.e. the intersection region E in FIG. 1). The articles storing device 4 and other devices, for example the articles storing device 4 and the battery, may be arranged in the spare space in the central portion and the rear portion of the unmanned aerial vehicle 100. Meanwhile, in the front of the airframe 2 may the front arrangement plate 3 be provided for placing other accessories, such as a flight control module, the current detection module and the auxiliary device of the unmanned aerial vehicle 100.

The arm may be configured as a linear shape or an arc shape.

As an improvement of the present disclosure, the arm is provided with a fixing piece, and the fixing piece includes a first fixing portion 10 and a second fixing portion 11.

At least one of the first fixing portion 10 and the second fixing portion 11 is connected with the airframe 2, the first fixing portion 10 and the second fixing portion 11 are connected and fit with each other to define a mounting groove, and the arm is disposed through the mounting groove.

In an embodiment of the present disclosure, specifically, the first fixing portion 10 is connected with the airframe 2, the second fixing portion 11 is connected with the airframe 2, the first fixing portion 10 and the second fixing portion 11 are connected and fit with each other to define the mounting groove, and the arm is disposed through the mounting groove. In addition, the first fixing portion 10 and the second fixing portion 11 are provided with at least one outer flat surface 1001, 1101 connected with the airframe 2 separately.

In some embodiments of the present disclosure, the arm may be provided with an arm deflection locking hole 12, and at least one of the first fixing portion 10 and the second fixing portion 11 is provided with an arm deflection fixing hole 15 in a position corresponding to the arm deflection locking hole 12. In a specific embodiment of the present disclosure, the first fixing portion 10 and the second fixing portion 11 are both provided with the arm deflection fixing hole 15 in the position corresponding to the arm deflection locking hole 12. The first fixing portion 10 and the second fixing portion 11 may also be provided with an arc inner surface 16 matching with an outer wall of the arm separately, and the two arc inner surfaces 16 cooperate to form the mounting groove through which the arm is disposed. The first fixing portion 10 and the second fixing portion 11 are provided with an arm fastening hole 13 for bolted connection and an airframe connecting hole 14 for bolted connection with the airframe 2.

A shape of the mounting groove may be designed to match with a shape of the arm. For example, a section shape of the mounting groove may be a circle when a section shape of the arm is a circle, and may be a square when the section shape of the arm is a square.

Figure 3:
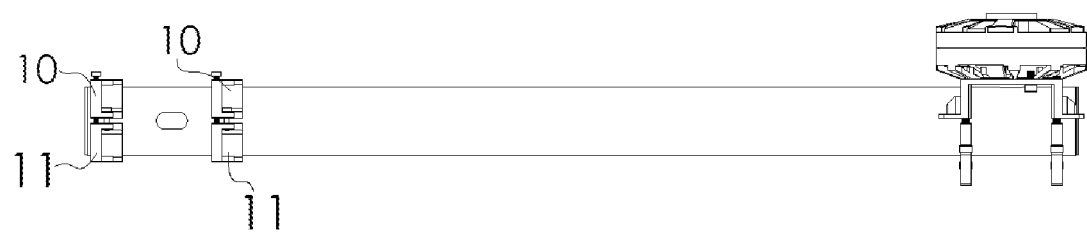
FIG. 3 is a front view of an arm, a first fixing portion, a second fixing portion and a rotor-wing electric motor in FIG. 1 assembled together.

A front view of an assembled arm is shown in FIG. 3, in which two arm fixing pieces, i.e. two first fixing portions 10 and two second fixing portions 11, and the arm are shown. The first fixing portion and the second fixing portion in a first arm fixing piece clamp the arm, and a second arm fixing piece is spaced apart from the first arm fixing piece by a certain distance and also clamps the arm.

Figure 4:
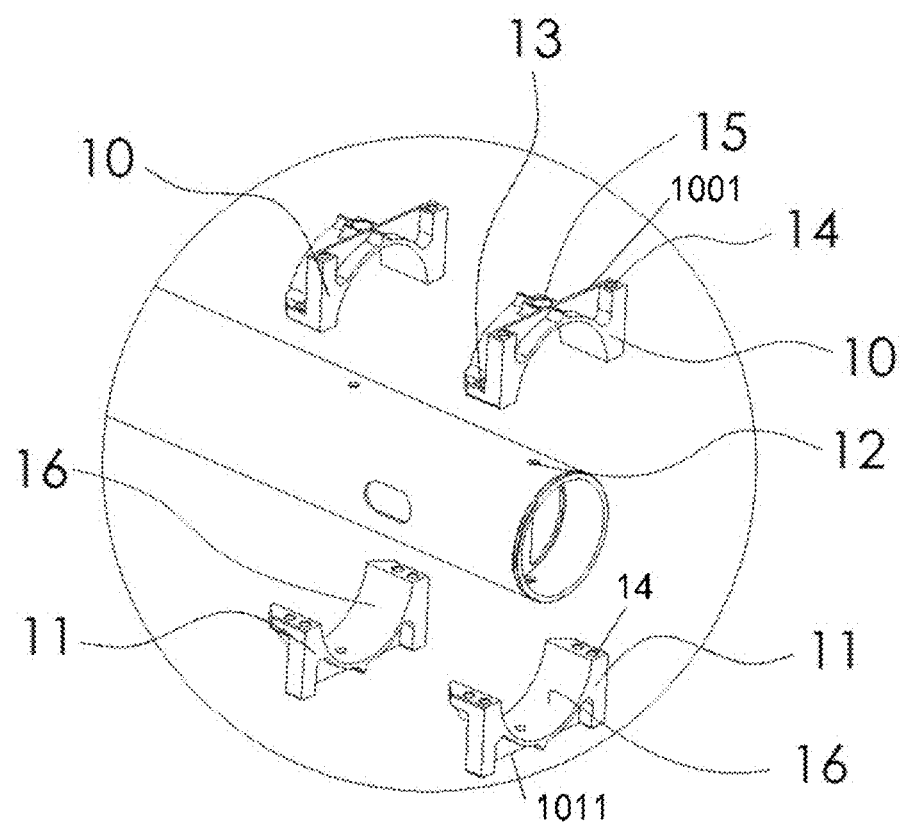
FIG. 4 is a partially exploded view of the arm and the rotor-wing electric motor in FIG. 3.

An exploded view of a partially assembled arm is shown in FIG. 4, in which the arm fastening hole 13, the airframe connecting hole 14, and the arm deflection fixing hole 15 are shown. The arm fastening hole 13 is used for fastening the first fixing portion 10 and the second fixing portion 11 with a screw, the airframe connecting hole 14 is used for fixing the first fixing portion 10 and the second fixing portion 11 to the airframe 2 with a screw, and the arm deflection fixing hole 15 is used for locking the arm in a fixed angle with a screw as required. The arc inner surface 16 is located at a position where the first fixing portion 10 and the second fixing portion 11 clamp the arm. In an axial direction of the arc inner surface 16, the first fixing portion 10 and the second fixing portion 11 each have an increased thickness.

Figure 5:
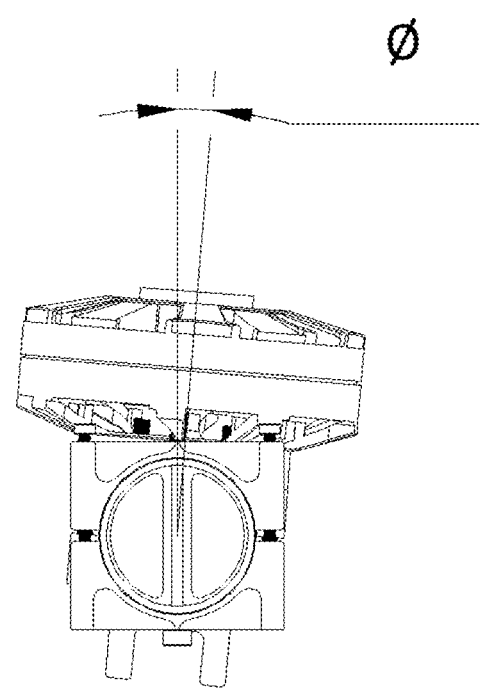
FIG. 5 is a right view of assembled arm and rotor-wing electric motor in FIG. 3, in which the rotor-wing electric motor is in a deflected state relative to the arm.

A schematic view of deflection of the arm is shown in FIG. 5, a screw for locking the deflection of the arm goes through the arm deflection locking hole 12.

During the use, the first fixing portion 10 and the second fixing portion 11 of the first arm fixing piece clamp the arm, then screws go through the arm deflection fixing hole 15 and the arm deflection locking hole 12 in the arm and fasten the first fixing portion 10 and the second fixing portion 11 with the arm, and the arm is clamped with the screw going through the arm fastening hole 13; the second arm fixing piece is mounted to a corresponding position of the arm and spaced apart from the first arm fixing piece by a certain distance. Upper and lower planes of the above arm connection part are arranged in a same plane worktable and keep parallel with each other. Then the rotor-wing electric motor 93 is mounted to the second end of the arm, and by adjusting a lower surface of an electrical motor base to be horizontal or have a certain angle D, the rotor-wing electric motor 93 is perpendicular to or forms the angle D with a vertical plane, along an axial direction of the arm. When the rotor-wing electric motor 93 is fixed, the arm mounted with the arm fixing piece is assembled to the airframe 2 i.e. fastening the arm to the airframe 2 with screws through the airframe connecting hole 14.

With the method for fixing the arm and the airframe 2 guarantees that the arm is not easy to swing in the axial direction, the arm may be fixed to a plurality of fixing pieces at a required deflection angle, and then be mounted to the airframe 2.

As shown in FIG. 10 to FIG. 14, a heat dissipation waterproof cover 90 is disposed to an upper end face of the rotor-wing electric motor 93 of the unmanned aerial vehicle 100, and the heat dissipation waterproof cover 90 includes an upper sealing surface 914 and a sidewall circumferential surface 92. The sidewall circumferential surface 92 is provided with a certain number of ventilation holes 915 adjacent to the upper sealing surface 914, and a blade 911 distant from a center of the heat dissipation waterproof cover (abbreviated as blade 911 hereinafter) is disposed in the heat dissipation waterproof cover 90 and extends from the ventilation hole 915 towards a center of an inner wall of the upper sealing surface 914. In some embodiments of the present disclosure, an annular cavity 916 fitted with an air hole 931 inside the rotor-wing electric motor 93 is formed between the center of the inner wall center of the upper sealing surface 914 and the blade 911. A height of a portion of the blades 911 adjacent to the center of the inner wall center of the upper sealing surface 914 is smaller than a height of another portion of the blades 911 adjacent to the ventilation hole 915.

The above heat dissipation waterproof cover 90 may cover an upper portion and a circumference of the rotor-wing electric motor 93, and an upper portion of the heat dissipation waterproof cover 90 is sealed while the other end thereof is open. A positioning hole 913 may be provided in the upper sealing surface 914 sealed by the heat dissipation waterproof cover 90 so as to fix the heat dissipation waterproof cover 90 to an end face of a rotor of the rotor-wing electric motor 93 by means of a screw 91. A plurality of (twenty five in the present embodiment) blades 911 are disposed from an inner side of the upper sealing surface 914 to an inner wall 912 of the sidewall circumferential surface, an angle between a tangential direction and a radial direction of a tail end of the blade 911 is recorded as $\beta$, and a shape of the blade 911 may be designed as three types shown in the figures, namely a rearward type with $0°<\beta<90°$, a radial type with $\beta=90°$ and a forward type with $90°<\beta<180°$. One annular cavity 916 is spared in a radial inner side of the blade 911, and a diameter of an outer circle of the annular cavity 916 is larger than a diameter of the air hole inside the electric motor. Meanwhile, the ventilation hole 915 is provided in an upper edge of the sidewall circumferential surface 92 around the heat dissipation waterproof cover 90, i.e. hollowing out a part of the sidewall circumferential surface 92 in a gap between two adjacent blades 911, and as a result the ventilation hole 915 located in a joint area of the upper sealing surface 914 and the sidewall circumferential surface 92 is formed.

During rotation of the rotor of the rotor-wing electric motor 93, the heat dissipation waterproof cover 90 rotates along with the rotor, and the blades 911 inside the heat dissipation waterproof cover 90 rotate around an rotation center of the rotor-wing electric motor 93, which makes the hot air produced by the rotation of the rotor-wing electric motor 93 be thrown out by a centrifugal force produced by the rotation of the blades 911. A negative pressure is produced in the annular cavity 916 inside the heat dissipation waterproof cover 90, an airstream enters into a lower portion of the rotor-wing electric motor 93 and is thrown out from the ventilation hole 915 by the centrifugal force, thereby keeping the airstream flowing to dissipate heat for the rotor-wing electric motor 93. In addition, as an upper covering surface of the heat dissipation waterproof cover 90 covers the upper portion of the electric motor 93, rain cannot enter the rotor-wing electric motor from the upper portion thereof, and is blown away by the high-speed airstream thrown out of the ventilation hole when flowing towards the joint area of the upper sealing surface 914 and the sidewall circumferential surface 92 of the heat dissipation waterproof cover 90.

As shown in FIG. 6 to FIG. 9, a folding cavity body 81, an adaptor 82 and a sprinkle-nozzle foldable rod 83 are disposed below the arm, and a driving assembly is disposed within the folding cavity body 81. A central portion of the adaptor 82 is articulated within the folding cavity body 81, a front end of the adaptor 82 is connected with the driving assembly, and a rear end of the adaptor 82 passes through an opening of the folding cavity body 81 and is fixedly connected with a first end of the sprinkle-nozzle foldable rod 83.

The driving assembly includes a driving body, a driving shaft and a connection portion mounted within a casing. The driving shaft is able to be rotatably connected with the driving body and the connection portion, and the driving body is used to drive the driving shaft to rotate so that the connection portion pushes the adaptor to rotate relative to the casing between a first position and a second position.

The driving body is configured as a gear motor 88, the driving shaft is configured as a screw rod 832, and the connection portion is configured as a sliding block 831.

An outer wall of the driving shaft is provided with an outer thread 8321, the connection portion is provided with a fitting hole 8331, an inner wall of the fitting hole 8331 is provided with an inner thread, the driving shaft goes through the connection portion, and the outer thread 8321 is fitted with the inner thread.

A first end of the driving shaft away from the driving body is provided with a thrust bearing 89, the thrust bearing 89 is fixed within the casing, and the driving shaft is rotatably disposed through the thrust bearing 89.

The front end of the adaptor 82 is formed to be a U-shaped groove 821 and the connection portion is arranged within the U-shaped groove 821.

That is, a folding mechanism of the sprinkle nozzle is disposed below the arm, and includes the folding cavity body 81, the adaptor 82, the sprinkle-nozzle foldable rod 83, a sprinkle-nozzle rotating electric motor 422, and a sprinkling piece 41 driven to operate by the sprinkle-nozzle rotating electric motor 422. A first end of the folding cavity body 81 is provided with a signal interface circuit plate 87 and a second end thereof is provided with the opening. The gear motor 88 and the screw rod 832 are disposed within the folding cavity body 81. An output end of the signal interface circuit plate 87 is electrically connected with an input end of the gear motor 88. An output shaft of the gear motor 88 is in axial transmission connection with a first end of the screw rod 832, and a second end of the screw rod 832 is provided with the thrust bearing 89. A convex shaft 822 is disposed in an inner cavity wall of the folding cavity body 81 adjacent to the opening, and the convex shaft 822 is connected with the central portion of the adaptor 82. A first end of the adaptor 82 is formed to be the U-shaped groove 821, and the sliding block 831 is disposed in the U-shaped groove 821. A central portion of the sliding block 831 is provided with a threaded hole through which the screw rod 832 passes and by which the sliding block is in threaded connection with the screw rod 832. Two opposite inner cavity walls of the folding cavity body 81 are provided with linear sliding grooves 813 in which two ends of the sliding block 831 slide along an axial direction of the screw rod 832. A second end of the adaptor 82 extends from the opening of the folding cavity body 81 to the outside of the folding cavity body 81 and is fixedly connected with the first end of the sprinkle-nozzle foldable rod 83. The sprinkle-nozzle rotating electric motor 422 and the sprinkling piece 41 are disposed at a second end of the sprinkle-nozzle foldable rod 83.

Figure 6:
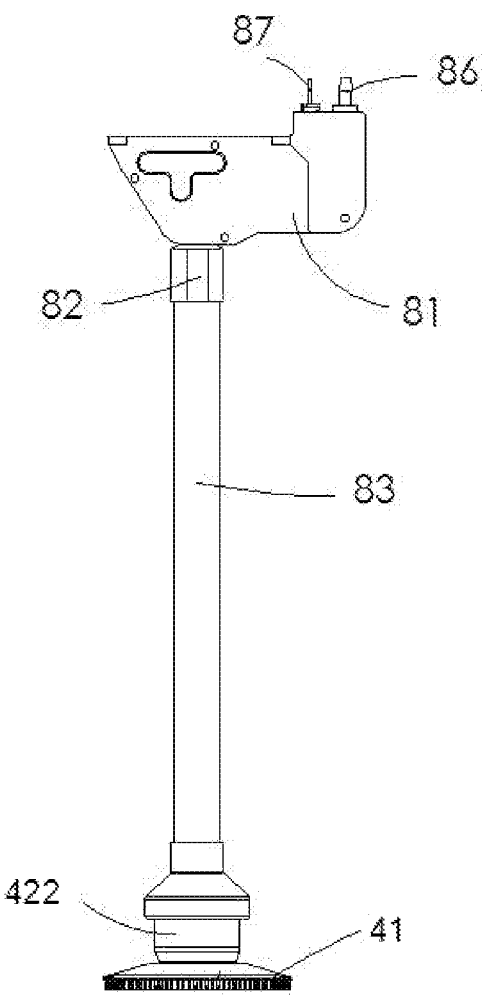
FIG. 6 is a front view of the sprinkle-nozzle foldable rod for fixing the sprinkle nozzle of the unmanned aerial vehicle in FIG. 1, in which it is in an unfolded state.
Figure 7:
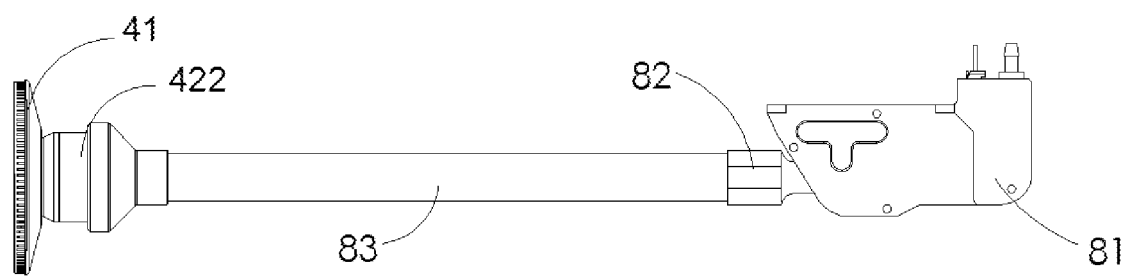
FIG. 7 is a schematic view of the sprinkle-nozzle foldable rod for fixing the sprinkle nozzle in FIG. 6 where the sprinkle-nozzle foldable rod is in a folded state in another angle of view.

FIG. 6 is a schematic view of the sprinkle nozzle in a vertically laid down state, and FIG. 7 is a schematic view of the sprinkle nozzle in a horizontally folded state. The folding mechanism of the sprinkle nozzle mainly includes the folding cavity body 81, the adaptor 82, the sprinkle-nozzle foldable rod 83, the sprinkle-nozzle rotating electric motor 422 and the sprinkling piece 41. The sprinkle-nozzle foldable rod 83 is connected with the folding cavity body 81 by means of the adaptor 82, the sprinkle-nozzle rotating electric motor 422 and the sprinkling piece 41 are fixedly connected with the sprinkle-nozzle foldable rod 83, and the sprinkle-nozzle rotating electric motor 422 drives the sprinkling piece 41 to rotate.

The first position may be designed as a retracted position of the sprinkle-nozzle foldable rod 83 and the sprinkling piece 41, and the second position may be designed as an unfolded position of the sprinkle-nozzle foldable rod 83 and the sprinkling piece 41. In a practical operation process, in an example for illustration, the retracted position of the sprinkle-nozzle foldable rod 83 and the sprinkling piece 41 is a horizontal position, and the unfolded position of the sprinkle-nozzle foldable rod 83 and the sprinkling piece 41 is a vertical position. It could be understood that, in other examples, the first position and the second position may be designed specifically according to application circumstances of the unmanned aerial vehicle 100 and not be limited to the specific positions defined by embodiments of the present disclosure.

Figure 8:
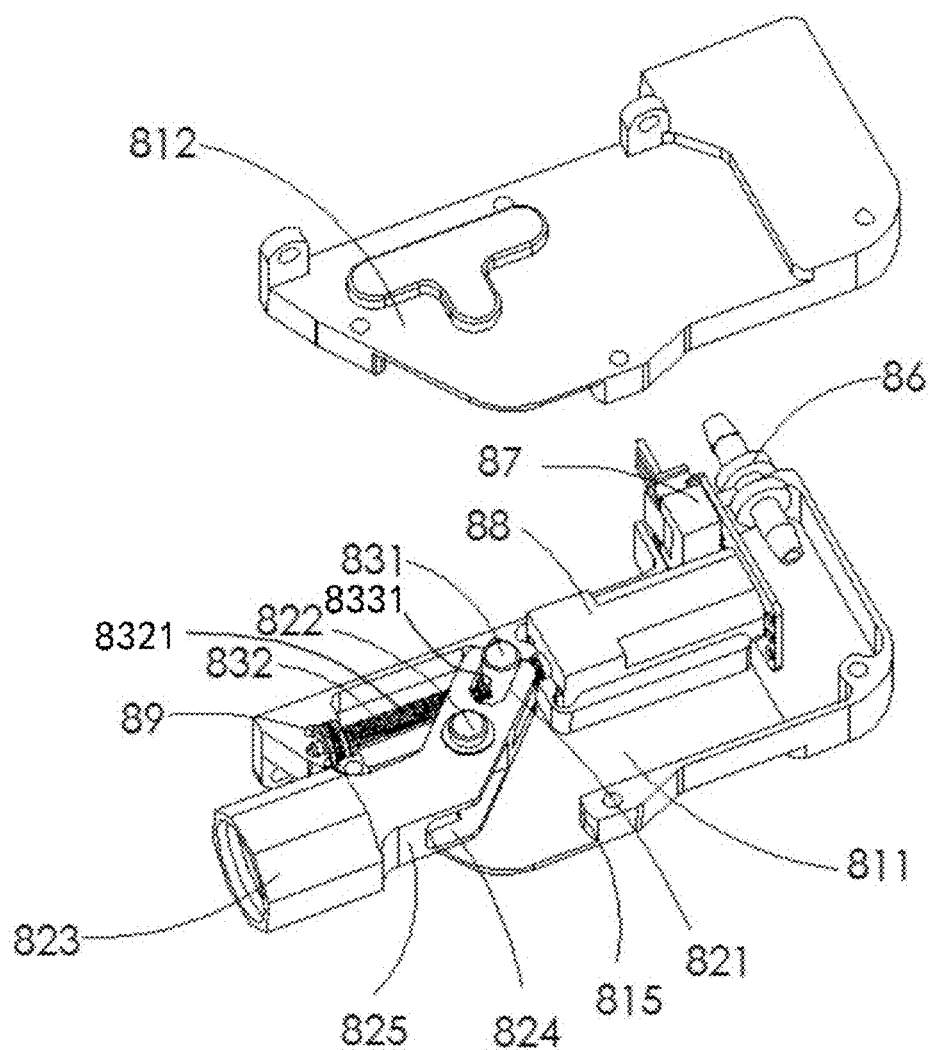
FIG. 8 is an exploded view of a folding cavity body in FIG. 6.

As shown in FIG. 8, a schematic view of an inner structure of the folding cavity body 81 is illustrated, including a left side casing 811, a right side casing 812, the gear motor 88, the adaptor 82, the screw rod 832, the sliding block 831 and the thrust bearing 89. The gear motor 88 is mounted in a square groove of the left side casing 811 and the right side casing 812. The screw rod 832 is connected with the output shaft of the gear motor 88, and the tail end of the screw rod 832 resists against the thrust bearing 89. The sliding block 831 centrally provided with the threaded hole is screwed onto the screw rod 832 and the threaded hole is spirally fitted with the screw rod 832.

Figure 9:
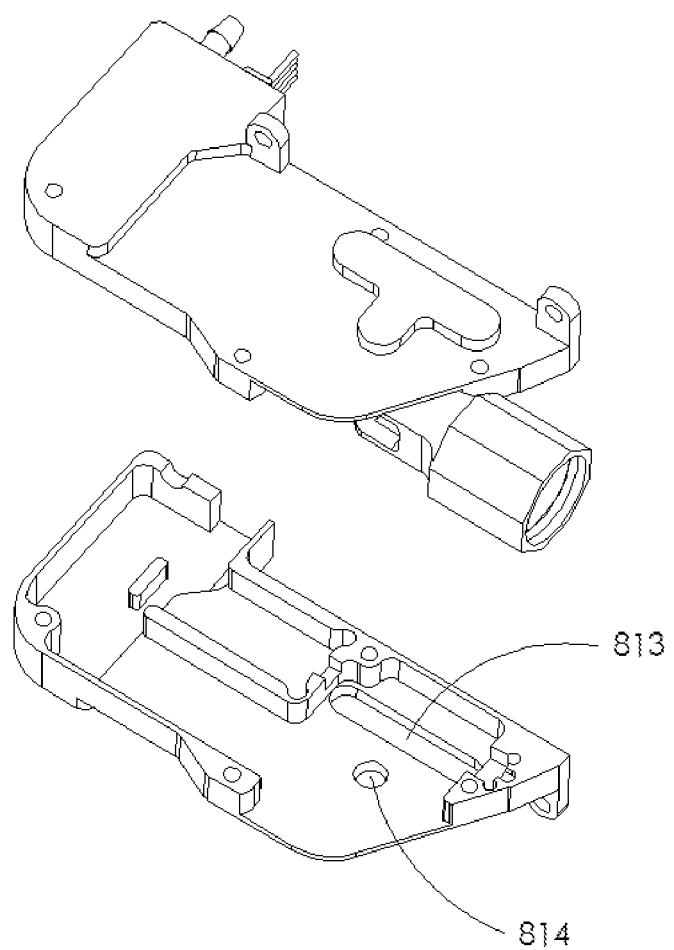
FIG. 9 is a schematic view of FIG. 8 in another angle of view.
Figure 10:
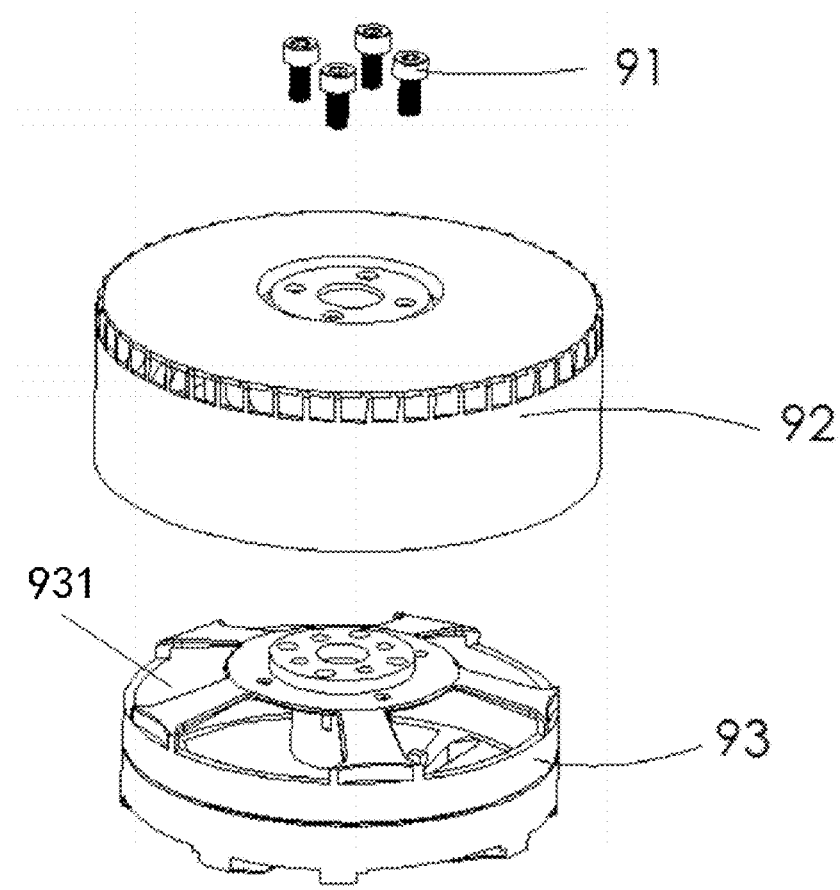
FIG. 10 is an exploded view of a heat dissipation waterproof cover and a rotor-wing electric motor in embodiments of the present disclosure.
Figure 11:
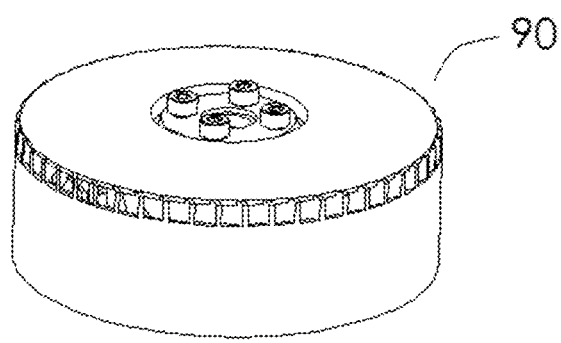
FIG. 11 is an assembling view of the heat dissipation waterproof cover and the rotor-wing electric motor in FIG. 10.
Figure 12:
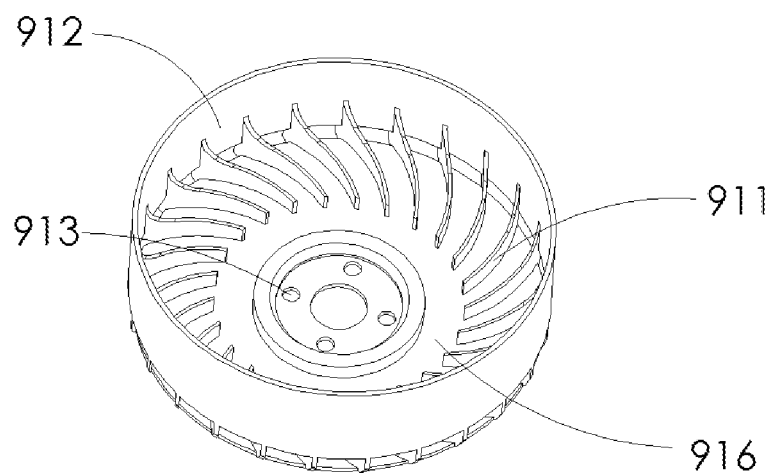
FIG. 12 is a perspective view of the heat dissipation waterproof cover in FIG. 10.
Figure 13:
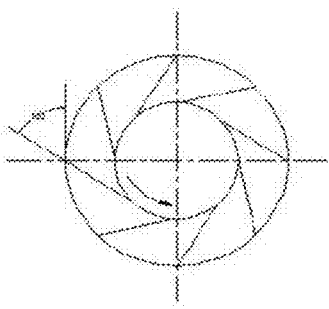
FIG. 13 is a schematic view of a blade distant from a center of the heat dissipation waterproof cover in other embodiments of the present disclosure.
Figure 13:
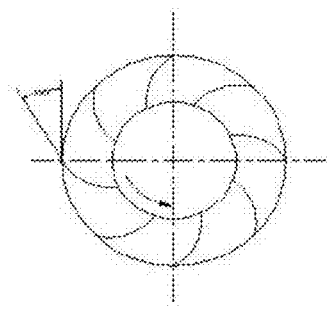
Figure 13:
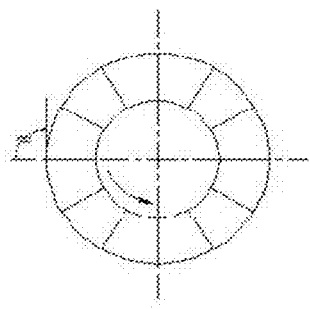
Figure 13:
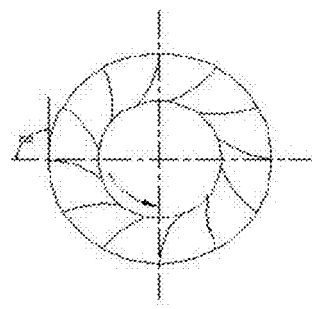
Figure 13:
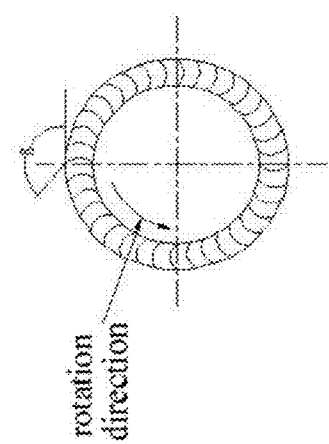
Figure 13:
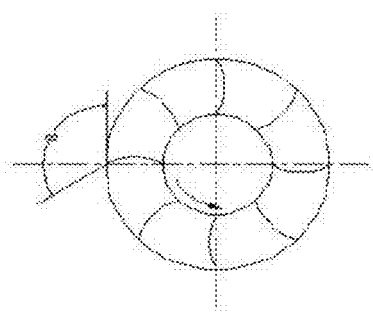
Figure 14:
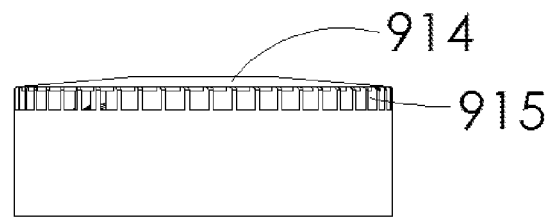
FIG. 14 is a side view of the heat dissipation waterproof cover in FIG. 10.

As shown in FIG. 8 and FIG. 9, two sides of the threaded hole in the center of the sliding block 831 are slidingly fitted with the U-shaped groove 821 of the adaptor 82, and two ends of the sliding block 831 are slidingly fitted with the corresponding linear sliding grooves 813 in the left side casing 811 and the right side casing 812 in the figures, i.e. the sliding block 831 may slide along the linear sliding grooves. The convex shafts 822 are provided at the left or the right side of a corner position of the adaptor 82, and the convex shaft 822 is rotatably fitted with corresponding circular holes 814 in the left side casing 811 and the right side casing 812 in the figures, and a rotational connection is formed. A hollow hole 824 is provided inside the adaptor 82, and cables used for circuit control and a water outlet pipe adaptor 86 for the sprinkle nozzle as well as the pipes thereof may go through the hollow hole 824.

Figure 15:
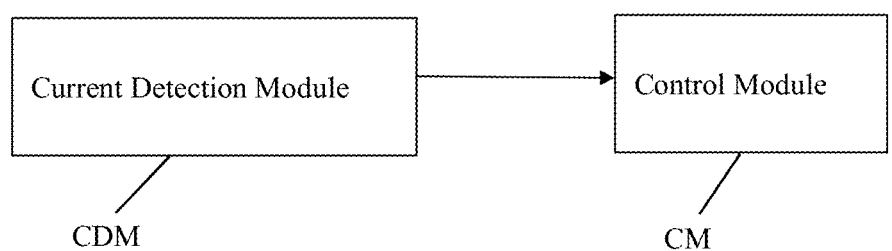
FIG. 15 is a block diagram of the current detection module and control module according to embodiments of the present disclosure.

As shown in FIG. 15, the unmanned aerial vehicle 100 further includes the following modules: the control module (CM) and the current detection module (CDM). The control module (CM) is used to control the driving assembly to drive the adaptor to rotate; the current detection module (CDM) is used to detect whether a current of the driving assembly is larger than a preset threshold, if the current of the driving assembly is larger than the preset threshold, the current detection module (CDM) is used to send a control signal for turning off the driving assembly to the control module (CM), and if the current of the driving assembly is not larger than the preset threshold, the current detection module (CDM) is used to continue detecting whether the current of the driving assembly is larger than the preset threshold; the control module (CM) is used to turn off the driving assembly according to the control signal. Thus, the control module (CM) and the current detection module (CDM) are used for automatic control over the folding mechanism of the sprinkle nozzle.

A method for using and controlling the folding mechanism of the sprinkle nozzle will be described below.

When the unmanned aerial vehicle 100 is in a takeoff awaiting state, the sprinkle-nozzle foldable rod 83 and the sprinkling piece 41 are folded in the horizontal position by means of the folding mechanism of the sprinkle nozzle, and the sliding block 831 is located at an extreme position of the screw rod 832 near the gear motor 88. After the unmanned aerial vehicle 100 takes off, the sprinkle nozzle needs to perform an agricultural sprinkling operation, and the gear motor 88 receives a driving signal from the signal interface circuit plate 87 and hence rotates clockwise to push the sliding block 831 to the end of the screw rod 832 close to the thrust bearing 89. In this process, the two ends of the sliding block 831 are limited to move in parallel along a straight line by the linear sliding grooves 813 on the left side casing 811 and the right side casing 812, thus preventing the sliding block 831 from rotating around the axial direction of the screw rod 832. Meanwhile, the sliding block 831 is limited within the U-shaped groove 821 of the adaptor 82, and as a result, the sliding block 831 pushes the U-shaped groove 821 during the movement so that the adaptor 82 rotates around the convex shaft 822. The second end of the adaptor 82 is connected with the first end of the sprinkle-nozzle foldable rod 83 fixed with the sprinkle nozzle through a mounting hole 823 of the sprinkle-nozzle foldable rod 83, so that the sprinkle-nozzle foldable rod 83 is driven to rotate around the convex shaft 822 till the sprinkle-nozzle foldable rod 83 rotates to the vertical position. When a first contact surface 825 of the adaptor 82 touches a first end face 815 of an open end of the left side casing 811 and the right side casing 812, the adaptor 82 is plugged up and cannot rotate (being limited to the first position), meanwhile the sliding block 831 cannot continue rotating, and neither can the screw rod 832. In such a case, the load of the gear motor 88 is increased, so the current through the gear motor 88 instantly increases greatly. When the current detection module in the unmanned aerial vehicle 100 detects that the current increases greatly, the current detection module sends a detection signal to the control module, then the control module sends the control signal to the gear motor 88, and finally the electric motor is made to stop. During the flight of the unmanned aerial vehicle 100, the sprinkle-nozzle foldable rod 83 fixed with the sprinkle nozzle is retained to be perpendicular to the arm and face downwards. When the operation is finished, the unmanned aerial vehicle 100 hovers above a landing position, and at this time the control module sends the driving signal to the gear motor 88 to make it rotate counterclockwise so as to retract the sprinkle-nozzle foldable rod 83 fixed with the sprinkle nozzle to the horizontal position, in which this process is similar to the process of unfolding the sprinkle-nozzle foldable rod 83 and the relevant mechanisms move in an opposite direction.

With the above folding mechanism of the sprinkle nozzle, on one hand, the sprinkle-nozzle foldable rod 83 can be folded and stored during packaging and transportation, and on the other hand, the sprinkle-nozzle foldable rod 83 fixed with the sprinkle nozzle can be unfolded when the unmanned aerial vehicle 100 performs the sprinkling operation, and in addition, the sprinkle-nozzle foldable rod 83 can be folded when not in use.

As shown in FIG. 1, in embodiments of the present disclosure, an unmanned aerial vehicle body 1 including an airframe 2 and an articles storing device 4 disposed behind the airframe 2 and configured to store a variable weight part is shown.

In some embodiments of the present disclosure, the unmanned aerial vehicle body 1 is configured for an unmanned aerial vehicle 100. As shown in FIG. 1 to FIG. 17, the unmanned aerial vehicle 100 further includes: an arm including at least two front arms 101 symmetrically arranged with respect to a central axis of the airframe 2 along a front-rear direction and at least two rear arms 102 symmetrically arranged with respect to the central axis of the airframe 2; and a rotor-wing electric motor including a front electric motor 93a and a rear electric motor 93b. A first end of the front arm 101 is connected with a front end of the airframe 2, and a second end of the front arm 101 is provided with the front electric motor 93a to drive the unmanned aerial vehicle 100. A first end of the rear arm 102 is connected with a rear end of the airframe 2, and a second end of the rear arm 102 is provided with the rear electric motor 93b to drive the unmanned aerial vehicle 100. An acting point of a resultant force from the front electric motor 93a and the rear electric motor 93b exerted on the unmanned aerial vehicle 100 is the lift force center, and a gravity center of the unmanned aerial vehicle 100 is adjacent to the lift force center, a projection of the lift force center on a horizontal plane is configured to be adjacent to a projection of a gravity center of the variable weight part on the horizontal plane.

Reference throughout this specification to "an embodiment," "some embodiments," "illustrative embodiment", "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics may be combined in any suitable manner in one or more embodiments or examples.

Although embodiments of the present disclosure have been shown and described, it would be appreciated by those skilled in the art that changes, alternatives, variation and modifications can be made in the embodiments without departing from spirit and principles of the present disclosure, and the scope of the present disclosure is limited by the claims and its equivalents.

What is claimed is:

1. An unmanned aerial vehicle, comprising:
   an unmanned aerial vehicle body comprising an airframe and an articles storing device, the articles storing device being disposed behind the airframe, and articles stored in the articles storing device being a variable weight part;
   at least two front arms symmetrically arranged with respect to a central axis of the airframe along a front-rear direction;
   at least two rear arms symmetrically arranged with respect to the central axis of the airframe;
   at least two front electric motors arranged on the least two front arms respectively;
   and at least two rear electric motors arranged on the least two rear arms respectively;
   wherein a first end of each of the at least two front arms is connected with a front end of the airframe, and a second end of each of the at least two front arms is provided with each of the at least two front electric motors to drive the unmanned aerial vehicle; a first end of each of the at least two rear electric motors is connected with a rear end of the airframe, and a second end of each of the at least two rear electric motors is provided with each of the at least two rear electric motors to drive the unmanned aerial vehicle;
   wherein a resultant force from the at least two front electric motors and the at least two rear electric motors exerted on the unmanned aerial vehicle is a lift force center, and a gravity center of the unmanned aerial vehicle is adjacent to the lift force center, the lift force center is adjacent to a gravity center of the variable weight part, and the lift force center is adjacent to a geometric center of the articles storing device.

2. The unmanned aerial vehicle according to claim 1, wherein each of the at least two front arms and the at least two rear arms is formed to be a linear shape or an arc shape.

3. The unmanned aerial vehicle according to claim 1, wherein each of the at least two front arms and the at least two rear arms is provided with an arm fixing piece and the arm fixing piece comprises:
   a first fixing portion connected with the airframe; and
   a second fixing portion connected with the airframe,
   wherein the first fixing portion and the second fixing portion are connected and fitted with each other to define a mounting groove, the arm is disposed through the mounting groove, and the first fixing portion and the second fixing portion are separately provided with at least one outer flat surface connected with the airframe.

4. The unmanned aerial vehicle according to claim 3, wherein each of the at least two front arms and the at least two rear arms is provided with an arm deflection locking hole running through each of the at least two front arms and the at least two rear arms, the first fixing portion and the second fixing portion are both provided with an arm deflection fixing hole in a position corresponding to an end of the arm deflection locking hole.

5. The unmanned aerial vehicle according to claim 3, wherein the first fixing portion and the second fixing portion are separately provided with an arc inner surface configured to be matched with an outer wall of the arm.

6. The unmanned aerial vehicle according to claim 3, wherein the first fixing portion and the second fixing portion are provided with an arm fastening hole configured for bolted connection and an airframe connecting hole configured for bolted connection with the airframe.

7. The unmanned aerial vehicle according to claim 1, wherein a folding cavity body, an adaptor and a sprinkle-nozzle foldable rod are disposed below each of the at least two front arms and the at least two rear arms, a driving assembly is disposed within the folding cavity body, a central portion of the adaptor is articulated within the folding cavity body, a front end of the adaptor is connected with the driving assembly, and a rear end of the adaptor passes through an opening of the folding cavity body and is fixedly connected with a first end of the sprinkle-nozzle foldable rod.

8. The unmanned aerial vehicle according to claim 7, wherein the driving assembly comprises a driving body, a driving shaft and a connection portion mounted within a casing, the driving shaft is configured to be rotatably connected with the driving body and the connection portion, and the driving body is used to drive the driving shaft to rotate so that the connection portion pushes the adaptor to rotate relative to the casing between a first position and a second position.

9. The unmanned aerial vehicle according to claim 8, wherein an outer wall of the driving shaft is provided with an outer thread, the connection portion is provided with a fitting hole, an inner wall of the fitting hole is provided with an inner thread, the driving shaft is configured to go through the connection portion, and the outer thread is configured to be fitted with the inner thread.

10. The unmanned aerial vehicle according to claim 8, wherein a first end of the driving shaft away from the driving body is provided with a thrust bearing, the thrust bearing is fixed within the casing, and the driving shaft is rotatably disposed through the thrust bearing.

11. The unmanned aerial vehicle according to claim 8, wherein the front end of the adaptor is formed to be a U-shaped groove and the connection portion is arranged within the U-shaped groove.

12. The unmanned aerial vehicle according to claim 7, wherein the unmanned aerial vehicle further comprises:
   a control module used to control the driving assembly to drive the adaptor to rotate; and
   a current detection module,
   wherein the current detection module is used to detect whether a current of the driving assembly is larger than a preset threshold, and if the current of the driving assembly is larger than the preset threshold, the current detection module is used to send a control signal for turning off the driving assembly to the control module; and the control module is used to turn off the driving assembly according to the control signal.

13. The unmanned aerial vehicle according to claim 1, wherein a heat dissipation waterproof cover is disposed to an upper end face of each of the at least two front electric motors and the at least two rear electric motors, the heat dissipation waterproof cover comprises an upper sealing surface and a sidewall circumferential surface, the sidewall circumferential surface is provided with a certain number of ventilation holes adjacent to the upper sealing surface, and a blade distant from a center of the heat dissipation waterproof cover is disposed in the heat dissipation waterproof cover and extends from the ventilation hole towards a center of an inner wall of the upper sealing surface.

14. The unmanned aerial vehicle according to claim 13, wherein an annular cavity is fitted with an air hole inside each of the at least two front electric motors and the at least two rear electric motors and formed between the center of the inner wall of the upper sealing surface and the blade.

15. The unmanned aerial vehicle according to claim 13, wherein a height of a portion of the blade adjacent to the center of the inner wall of the upper sealing surface is smaller than a height of another portion of the blade adjacent to the ventilation hole.

16. The unmanned aerial vehicle according to claim 1, wherein the gravity center of the unmanned aerial vehicle, the lift force center, and the geometric center of the articles storing device coincide.

17. The unmanned aerial vehicle according to claim 16, wherein the at least two front arms comprise two front arms and the at least two rear arms comprise two rear arms, an included angle between the two front arms is larger than an included angle between the two rear arms, and a length of each of the two rear arms is larger than a length of each of the two front arms.

18. The unmanned aerial vehicle according to claim 1, wherein an intersection region bounded by extension lines of the at least two rear arms towards the airframe and extension lines of the at least two front arms towards the airframe is located in front of a lift force center of the unmanned aerial vehicle.

19. An unmanned aerial vehicle body, comprising an airframe and an articles storing device, the articles storing device being disposed behind the airframe, and articles stored in the articles storing device being a variable weight part, wherein the unmanned aerial vehicle body is configured for an unmanned aerial vehicle, and the unmanned aerial vehicle further comprises:

at least two front arms symmetrically arranged with respect to a central axis of the airframe along a front-rear direction and at least two rear arms symmetrically arranged with respect to the central axis of the airframe;

at least two front electric motors arranged on the least two front arms respectively;

and at least two rear electric motors arranged on the least two rear arms respectively;

wherein a first end of each of the at least two front arms is connected with a front end of the airframe, and a second end of each of the at least two front arms is provided with each of the at least two front electric motors to drive the unmanned aerial vehicle; a first end of each of the at least two rear electric motors is connected with a rear end of the airframe, and a second end of each of at the least two rear electric motors is provided with each of the at least two rear electric motors to drive the unmanned aerial vehicle; and wherein a resultant force from the at least two front electric motors and the at least two rear electric motors exerted on the unmanned aerial vehicle is a lift force center, and a gravity center of the unmanned aerial vehicle is adjacent to the lift force center, the lift force center is adjacent to a gravity center of the variable weight part, and the lift force center is adjacent to a geometric center of the articles storing device.

* * * * *